Sept. 28, 1965    L. D. DUNN    3,208,310
METHOD OF MAKING SAW BLADES
Filed Aug. 2, 1963    2 Sheets-Sheet 1
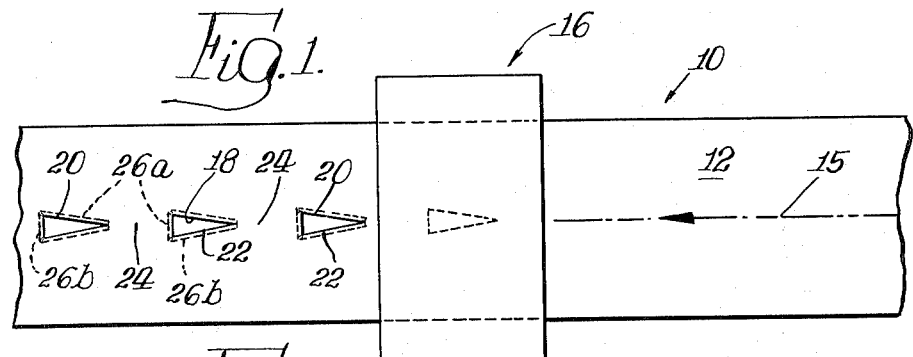
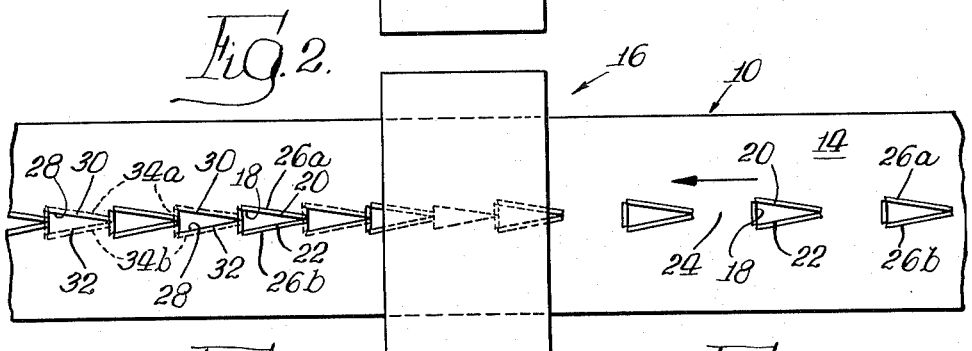
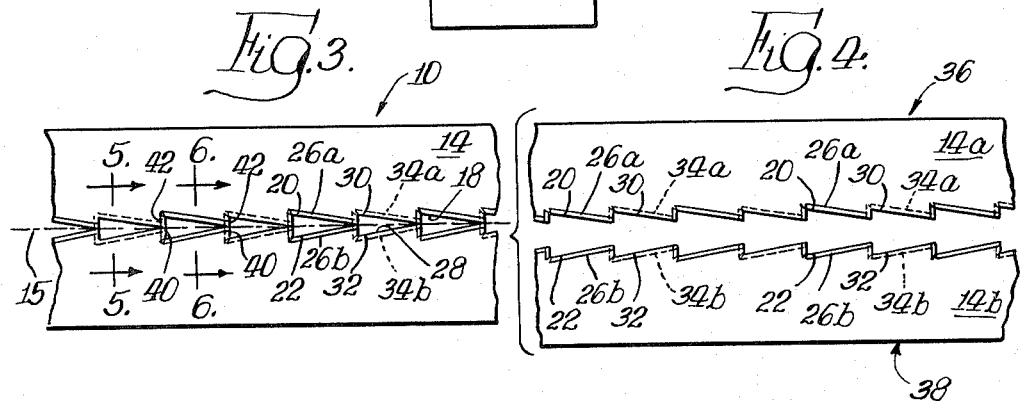
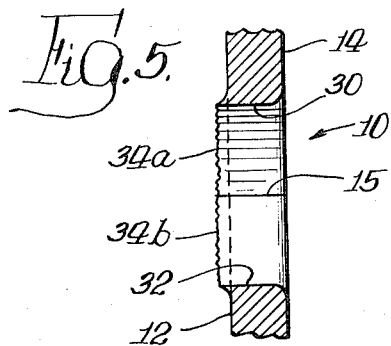
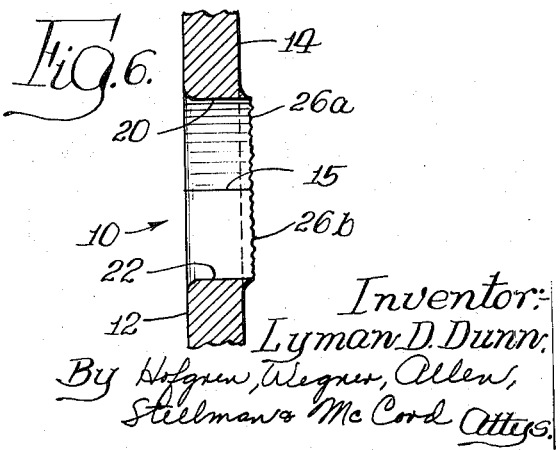
Inventor:
Lyman D. Dunn,
By Hofgren, Wegner, Allen,
Stellman & McCord Attys.

Sept. 28, 1965    L. D. DUNN    3,208,310
METHOD OF MAKING SAW BLADES
Filed Aug. 2, 1963    2 Sheets-Sheet 2
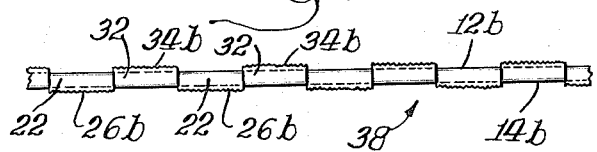
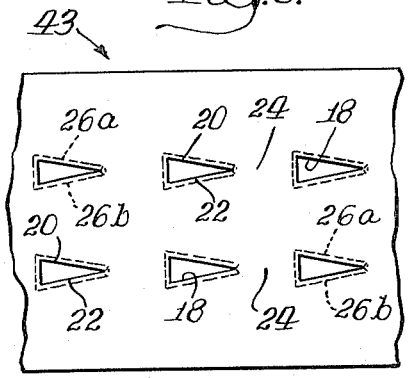
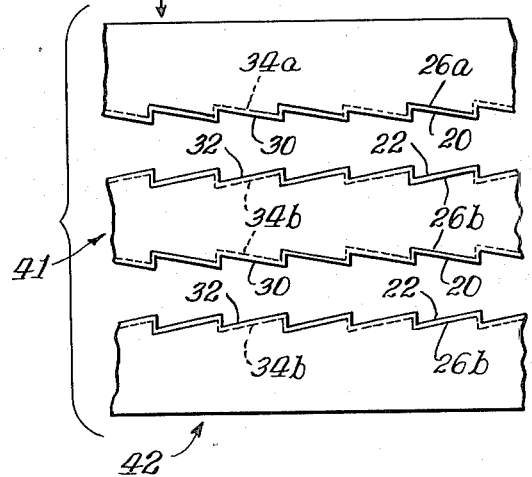
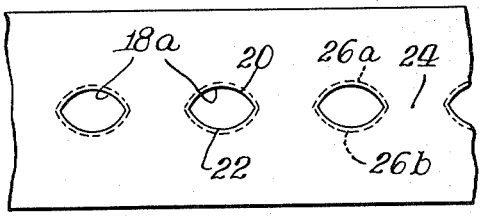
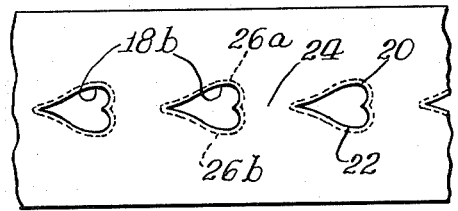

United States Patent Office 3,208,310
Patented Sept. 28, 1965

3,208,310
METHOD OF MAKING SAW BLADES
Lyman D. Dunn, Chicago, Ill., assignor to Marlan
Company, a corporation of Illinois
Filed Aug. 2, 1963, Ser. No. 299,516
3 Claims. (Cl. 76—112)

This application relates to saw blades and more particularly to a new and improved method for making saw blades.

Typical saw blade construction comprehends the formation of a saw having teeth that are "set" or misaligned with the plane of the blade. Setting of the teeth of a saw blade has always been an integral step in the production of a saw blade. Obviously, each additional step in production of any item increases the cost thereof and therefore if any one step in production can be eliminated a savings in cost is resultant. Thus it is desirable to eliminate the step of setting the teeth of the saw blade. Also, it has been unknown previously in the manufacture of saw blades to produce two saw blades having teeth with oppositely arranged burrs from a single saw blade with the use of but a single punch. While it has been known to use a single punch for forming all the teeth of two saw blades at the same time, and wherein the teeth formed have oppositely arranged burrs, up to now it has not been known that the act of punching could simultaneously produce the two separate saw blades.

It is therefore a general object of this invention to provide a new and improved method for the manufacture of saw blades.

It is a primary object of this invention to provide a new and improved method for the manufacture of saw blades which is free from the objections mentioned above.

It is another object of this invention to provide a new and improved method for the manufacture of saw blades consisting of the steps of punching a saw blade stock to form alternate spaced tooth edges and then punching the saw blade stock from the side opposite the first punching to form two saw blades each having teeth with oppositely arranged burrs.

It is still another object of this invention to provide a new and improved method for the manufacture of saw blades consisting of the steps of punching a spaced series of substantially equilateral triangular holes generally along the longitudinal axis of a saw blade blank to form a spaced series of opposed saw tooth edges having burrs on the side opposite from the punching, and thence punching the blank in the spaces between the first puncher openings from the side opposite from the first punching to form two saw blades having substantially aligned teeth with oppositely arranged burrs on the successive teeth thereof.

Other objects, features and advantages of the present invention will be apparent from the following description of the preferred embodiment illustrated in the accompanying drawings, in which:

FIGURE 1 is a partially diagrammatic view of the first step of the method of this invention showing the punch punching spaced openings in a saw blade blank;

FIGURE 2 is a partially diagrammatic view of the second step of this invention showing the punch punching the remaining openings in the spaces between the first opening on the reverse side of the saw blade blank;

FIGURE 3 is a fragmentary view of the saw blade blank after the two steps of this method have been completed;

FIGURE 4 is a fragmentary view of the portion of the saw blade blank illustrating the two saw blades formed as a result of the steps shown in FIGURES 1 and 2;

FIGURE 5 is an enlarged fragmentary section view taken along the line 5—5 of FIGURE 3;

FIGURE 6 is an enlarged fragmentary section view taken along the line 6—6 of FIGURE 3;

FIGURE 7 is a fragmentary top plan view of a portion of one of the saw blades produced by the method of this invention;

FIGURE 8 is an enlarged fragmentary view of a saw blade blank illustrating a step in the production of multiple saw blades from the single blank;

FIGURE 9 is a fragmentary view of the saw blade blank in FIGURE 8 showing the blank separated into three saw blades;

FIGURE 10 is a fragmentary view of a saw blade blank illustrating a different form of tooth configuration punched therein; and FIGURE 11 is a fragmentary view of another saw blade blank illustrating still another form of tooth configuration punched therein.

Referring now to the drawings, in FIGURES 1 and 2 there is shown a saw blade blank 10 having opposite sides 12 and 14 each substantially divided in half by a longitudinal axis schematically represented at 15. A well known punch means is diagrammatically represented at 16 for punching holes 18 in the saw blade stock in a suitable manner.

The holes 18 are punched substantially along the longitudinal axis of the saw blade blank and form oppositely facing saw teeth 20 and 22. In the embodiment shown the holes 18 are in the shape of an isosceles triangle but it is to be understood that the shape of the hole will be dependent upon the tooth configuration sought to be produced. For example, as illustrated in FIGURES 10 and 11, the holes might be generally oval shaped, such as holes 18a, or heart shaped, such as holes 18b. Each hole 18 is separated by a space 24 which is substantially coextensive with the hole. The punching on one side 12 of the saw blade blank causes burrs on the other side thereof. Thus along the saw tooth edges 20 burrs 26a are formed on the opposite side of the blank. Similarly along the saw tooth edges 22, burrs 26b are formed on the opposite side of the blank.

After the alternate series of spaced holes have been punched along the length of one side of the saw blade blank 12, the blank and punch are inverted relative to each other so that the punch will punch holes 28 from the opposite side 14 of the blank in the same direction as the holes 18. The holes 28 similarly produce saw tooth edges 30 and 32 and similarly produce burrs on the opposite side of the saw blank such as 34a and 34b, respectively.

As shown in FIGURE 3, when the entire extent of the saw blade blank has been punched as described, a series of holes 18 and 28 are formed therein in substantial alignment along the longitudinal axis 15 of the blank. Since the space 24 between the holes 18 is coextensive with the holes, the formation of the holes 28 in the spaces causes the apex 40 of each hole to intersect the base 42 of the next hole in line so that the second step of punching serves to separate the blade blank 10 into the two saw blades 36 and 38 as shown in FIGURE 4.

As shown in FIGURES 4–7, the two-step punching operation produces two saw blades 36 and 38 each having a plurality of substantially aligned teeth 20, 30 and 22, 32, respectively. Moreover, each of the aligned teeth 20, 30 and 22, 32, has successive oppositely arranged burrs 26a, 34a, and 26b and 34b, respectively.

FIGURES 8 and 9 illustrate a modified embodiment of the method of this invention. As illustrated therein, with the use of two punches, three blades 40, 41 and 42 can be made from a single blade stock 43. Blades 40 and 42 are substantially the same as blades 36 and 38 with teeth on one side of the blade only. However, blade 41 has teeth on both sides thereof. Similarly, if three punches were used then four blades could be produced by a single stock, to use teeth on both sides thereof and to use teeth on one side thereof. In either case the multiple die would still produce the multiple blades in the same two-step operation as disclosed herein.

The method of this invention eliminates the step of setting saw blade teeth and produces saw blades having successive aligned teeth with oppositely arranged burrs with the use of but a single die and a two-step operation on a saw blade blank. Moreover, the method of this invention produces two saw blades from the single saw blade blank as an integral part of the two-step punching operation. Thus the method of this invention reduces production cost by eliminating time and labor involved in the production of saw blades.

While I have shown and described certain embodiments of my invention, it is to be understood that it is capable of many modifications. Changes, therefore, in the construction and arrangement may be made without departing from the spirit and scope of my invention as set out in the appended claims.

I claim:

1. The method of making saw blades which consists of the steps of: providing a punch for punching tooth roots in a saw blade blank; punching first alternately spaced tooth roots in the saw blade blank from one direction to produce burrs on the side of the blank opposite from said punching; and punching second tooth roots in the saw blade blank from the opposite direction of the first punching in the spaces between the first punched tooth roots to form two saw blades having aligned straight teeth wherein the teeth have burrs on the opposite sides of each successive tooth.

2. The method of making saw blades which consists of the steps of: providing a punch for punching tooth roots having a tooth point and tooth base in a saw blade blank; punching first alternately spaced tooth roots in the saw blade blank with said punch generally along the center line of the saw blade blank from one direction to produce burrs on the side of the blank opposite from said punching; and punching second tooth roots with the same punch in the blank in the spaces between the first tooth roots from the side of the blank opposite from the first punching to thereby form two saw blades having aligned straight teeth wherein the tooth point and tooth base of all the teeth lie in substantially the same plane and wherein burrs are provided on the opposite sides of the successive teeth of the blades.

3. The method of making saw blades which consists of the steps of: providing a punch for punching tooth roots having a tooth point and a tooth base in a saw blade blank; punching first alternately spaced tooth roots in the saw blade blank with said punch from one direction to produce burrs on the side of the blank opposite from said punching; and punching second tooth roots in the blank with the same punch in the spaces between the first tooth roots from the side of the blank opposite from the first punching to form a finished saw blade having aligned straight teeth with burrs on the opposite sides of the successive teeth thereof.

References Cited by the Examiner

UNITED STATES PATENTS 3,117,472　1/64　Mingus et al. _____ 76—112

GRANVILLE Y. CUSTER, JR., *Primary Examiner.*